(12) United States Patent
Schneider et al.

(10) Patent No.: US 8,281,932 B2
(45) Date of Patent: Oct. 9, 2012

(54) APPARATUS AND METHOD FOR EFFICIENT PARTICLE TO GAS BUBBLE ATTACHMENT IN A SLURRY

(75) Inventors: Jakob H. Schneider, Calgary (CA); Tomasz Duczmal, Ontario (CA)

(73) Assignee: Hydro Processing & Mining Ltd. (CA)

( * ) Notice: Subject to any disclaimer, the term of this patent is extended or adjusted under 35 U.S.C. 154(b) by 561 days.

(21) Appl. No.: 12/443,463

(22) PCT Filed: Sep. 28, 2007

(86) PCT No.: PCT/CA2007/001741
§ 371 (c)(1),
(2), (4) Date: Mar. 27, 2009

(87) PCT Pub. No.: WO2008/037086
PCT Pub. Date: Apr. 3, 2008

(65) Prior Publication Data
US 2010/0051515 A1 Mar. 4, 2010

(30) Foreign Application Priority Data

Sep. 28, 2007 (CA) .................................. 2561539

(51) Int. Cl.
*B03D 1/14* (2006.01)
*B03D 1/24* (2006.01)
*C02F 1/24* (2006.01)
*B01F 3/04* (2006.01)

(52) U.S. Cl. ..... 209/164; 209/170; 210/703; 210/221.2; 261/122.1; 261/124

(58) Field of Classification Search .................. 209/164, 209/170, 730; 210/703, 221.1, 221.2; 261/122.1, 261/124
See application file for complete search history.

(56) References Cited

U.S. PATENT DOCUMENTS

| 4,279,743 A | 7/1981 | Miller |
| 4,397,741 A | 8/1983 | Miller |
| 4,399,027 A | 8/1983 | Miller |

(Continued)

FOREIGN PATENT DOCUMENTS

CA 1053388 4/1979

(Continued)

*Primary Examiner* — Thomas M Lithgow
(74) *Attorney, Agent, or Firm* — David B. Tingey; Kirton | McConkie (57) ABSTRACT

The present invention relates to an apparatus and a process for efficient hydrophobic particles to gas bubble attachment in a slurry is provided. The process comprises: tangentially introducing a slurry stream into a cylindrical chamber having a cylindrical inner wall with sufficient volume and pressure to develop a vortex in the flowing slurry; introducing gas into the flowing slurry during at least a portion of its travel in the chamber, the gas being introduced orthogonally to the stream through means located at the chamber inner wall and for developing gas bubbles which move into the slurry. The apparatus comprises of: a cylindrical chamber having a cylindrical inner wall, the chamber being oriented in any direction, enclosed at both ends, and with an entry port to introduce the stream of slurry to develop a spiral flow of the stream along the chamber inner wall toward the output end, a porous wall to permit the introduction of gas orthogonally into the stream to develop gas bubbles within the stream, and an exit port to discharge the mixture of slurry and gas bubbles.

24 Claims, 4 Drawing Sheets

U.S. PATENT DOCUMENTS

| | | |
|---|---|---|
| 4,744,890 A | 5/1988 | Miller et al. |
| 4,838,434 A | 6/1989 | Millet et al. |
| 5,192,423 A | 3/1993 | Duczmal et al. |
| 5,529,701 A * | 6/1996 | Grisham et al. ............... 210/787 |
| 6,106,711 A * | 8/2000 | Morse et al. ............... 210/221.2 |
| 6,171,488 B1 * | 1/2001 | Morse et al. ............... 210/221.2 |

FOREIGN PATENT DOCUMENTS

| | | |
|---|---|---|
| WO | WO 89/07015 | 8/1989 |
| WO | WO 93/13863 | 7/1993 |

* cited by examiner

APPARATUS AND METHOD FOR EFFICIENT PARTICLE TO GAS BUBBLE ATTACHMENT IN A SLURRY

FIELD OF THE INVENTION

The present invention relates to a process and apparatus for efficient hydrophobic particle attachment to gas bubbles in a slurry by creating and maintaining optimal conditions for attachment, and also for efficient hydrophobic particle entrainment in slurry and mixtures of water and insoluble liquids.

BACKGROUND OF THE INVENTION

Flotation systems are important unit operations in process engineering technology that were developed to separate particulate constituents from slurries. Flotation is a process for liquid and solid separation and also separation of insoluble liquids whereby gas is bubbled through a suspension of finely dispersed particles, and the hydrophobic particles are separated from the remaining slurry or mixture by attachment to, or entrainment by the gas bubbles. The gas bubble and particle aggregate, formed by adhesion or entrainment of hydrophobic particles to gas bubbles, is generally less dense than the slurry or mixture, thus causing the aggregate to rise to the surface of the flotation vessel. Flocculant dosing of the slurry or mixture also may be used to aid in the entrainment of hydrophobic particles. Separation of the hydrophobic particles is then accomplished by separating the upper layer of the slurry, which is in the form of a froth or foam, from the remaining slurry or mixture by hydrodynamic means or mechanical means or both, The fundamental step in froth flotation involves gas bubble to particle contact for a sufficient time to allow the particle to rupture the gas-slurry film and thus establish either attachment to or entrainment by gas bubbles. The total time required for this process is the sum of contact time and induction time, where contact time is dependent on bubble and particle motion and on the hydrodynamics of the system, whereas induction time is affected by the surface chemistry properties of the bubbles and particles. Traditional methods of creating conditions for froth flotation include the use of simple aerated or agitated cells, or chambers as termed herein, including flotation cells, flotation columns, direct air flotation cells with or without flocculant dosing, attrition scrubbers, heavy media separators, or impeller cells, and non-conventional flotation devices like vessels described in U.S. Pat. Nos. 4,838,434, 4,279,743, 4,397,741, 4,399,027, 4,744,890, or the device disclosed by authors in U.S. Pat. No. 5,192,423. However, flotation separation has certain limitations that render flotation cells and flotation columns inefficient in many applications. Particularly, in the past it has been recognized that conventional flotation is not very effective for the recovery of fine particles (less than 10 microns in diameter). This can be a serious limitation, especially in the separation of fine minerals. An explanation for this poor recovery is that particle momentum in traditional flotation devices is so slow that particle penetration of the gas-slurry film is inhibited, thus resulting in poor rates of attachment to the bubbles. Furthermore, conventional flotation has never been relied on as a process to effect separation of hydrocarbons in slurry.

A further limitation of conventional flotation systems is that nominal particle retention times in the order of several minutes are required to achieve successful separation. However, it has been shown that particle to gas bubble attachment occurs frequently in the order of milliseconds, therefore indicating that the rate of separation is mostly limited by low bubble-to-particle collision probability or transport or both rather than by other factors. As such, these necessary long retention times severely limit plant capacity and require the construction of relatively large and expensive equipment. Traditional flotation technology uses counter current flows, and multiple stages for the gas to be introduced to slurry. While these traditional methods and associated apparatus do achieve particle to gas bubble attachment, they are inefficient, requiring long processing times and consequent large equipment volumes. The inefficiency associated with the traditional prior art approaches arises largely from the relatively low gas to slurry volume ratio provided by the equipment.

That fact stipulates that the key in achieving high efficiency is in generating a high gas to slurry volume ratio. When very small bubble size and narrow size distribution is achieved then a high gas to slurry volume ratio is generated. The smaller the bubble the bigger the number of gas bubbles that can be packed into the unit volume. That translates directly to higher probability of bubble to particle collision and subsequent attachment or entrainment. The process of generating bubbles is dynamic and equilibrium must be achieved between creation of new bubbles and bubbles coalescing into bigger ones.

Inventive discoveries related to the present invention include that optimum bubble size distribution can be only achieved if a porous tubular housing with mean pores size below 100 microns is used for the gas diffuser. It has also been discovered that optimum conditions exist for a given range of G forces and Reynolds number, which impart limitations on flow rates and the diameter of diffuser. High Reynolds numbers promote maintaining small bubble size and so prevent bubble coalescence by ripping apart all bubbles bigger than eddies in the flow. However, too high G force quickly moves bubbles to the centre due to the buoyancy of the bubbles. Once at the centre, the flow becomes coaxial with consequently drastically lower Reynolds number and bubbles coalescence that rapidly lowers interfacial contact surface area.

Flotation machines function to provide the hydrodynamic and mechanical conditions that effect actual separation. Apart from the obvious requirements of feed entry and tailings exit from cells and banks and for hydrodynamic or mechanical froth removal, to be effective, the cell, or chamber as termed herein, typically also provides:

1. Effective suspension and dispersion of small particles to prevent sedimentation and to permit their contacting gas bubbles;
2. Influx of gas, bubble formation, and bubble dispersion;
3. Conditions favoring particle to bubble contact and either attachment or entrainment;
4. A non-turbulent surface region for stable froth formation and removal; and
5. In some cases, sufficient mixing for further mineral reagent interaction.

SUMMARY OF THE INVENTION

According to an aspect of the present invention, a process for attachment of hydrophobic particles to gas bubbles in a slurry comprises:
  i) introducing a stream of slurry into a cylindrical chamber having a cylindrical inner wall, the chamber being oriented in any direction and enclosed at both ends, said stream being introduced tangentially near a first end of said chamber, the entry end, to develop a spiral flow of said stream along said chamber inner wall toward the opposite second end of said chamber, the exit end;

ii) introducing said stream in sufficient volume and pressure to develop a vortex in said stream extending along said chamber;

iii) introducing gas into said stream during at least a portion of its travel in said chamber, said gas being introduced to said stream orthogonally through means located at said chamber inner wall for developing gas bubbles which move into said stream;

iv) said chamber being of sufficient length to provide a residence time for said stream in said chamber to permit a diffusion of gas into said stream; and vi) discharging the mixture of slurry, particles, and gas to exit said chamber at the exit end via one or more tangential exits, or via an axial exit enclosed by a pipe or other conduit, or via an axial exit.

In another aspect of the present invention, a process for entrainment of hydrophobic particles with gas bubbles comprises the aforesaid process with the stream consisting of a mixture of water and insoluble liquid or liquids.

In another aspect of the present invention, a process for attachment, or entrainment, of hydrophobic particles with gas bubbles comprises the additional steps of discharging said stream with froth of hydrophobic particles attached to gas bubbles to exit the vessel at the exit end and then either hydrodynamically or mechanically or both, removing said froth and separating it from the remaining slurry or mixture.

According to another aspect of the present invention, an apparatus for attachment of hydrophobic particles comprises:

i) a cylindrical chamber having a cylindrical inner wall, said chamber being oriented in any direction and enclosed at both ends;

ii) at least one entry port near a first end of said chamber, the entry end, to permit introduction of a stream of slurry tangentially of said inner wall into said chamber in a manner to develop a spiral flow of said stream along said chamber inner wall toward the opposite, second end of said chamber, the exit end;

iii) at least one entry port, such as in the form of a tangential header, allowing the introduction of said stream in sufficient volume and pressure to develop a vortex in said stream extending along said chamber inner wall;

iv) at least one gas entry port, that allows gas to be introduced into said inner chamber through means located along at least a portion of said chamber inner wall and preferably extending there around, for introducing gas orthogonally into said inner chamber as said stream passes over said gas introduction means, for developing gas bubbles which move into said stream;

v) said chamber being of sufficient length to provide a residence time for said stream in said chamber to permit a diffusion of gas into said stream;

vi) at least one exit port or other discharge exit allowing said stream with froth of gas bubbles with attached hydrophobic particles to exit said chamber at the exit end via one or more tangential exits, or via an axial exit enclosed by a pipe or other conduit, or via an axial exit; and vii) a system of valves and actuators which stops flow of said stream in case of gas pressure drop to stop the flow of said stream into the chamber in order to prevent slurry and particles from permeating through a porous tube.

In another aspect of the present invention, an apparatus for entrainment of hydrophobic particles with gas bubbles comprises the aforesaid apparatus with the stream consisting of a mixture of water and insoluble liquid or liquids.

In another aspect of the present invention, an apparatus for attachment, or entrainment, of hydrophobic particles with gas bubbles comprises either of the aforesaid apparatus plus means for either hydrodynamically or mechanically or both, removing said froth and separating it from the remaining slurry or mixture after discharge from said chamber.

BRIEF DESCRIPTION OF THE DRAWINGS

The present invention may be further understood by reference to the description of the invention, taken in conjunction with the accompanying drawings, in which.

DETAILED DESCRIPTION OF A PREFERRED EMBODIMENT

An apparatus of the present invention can be retrofitted into an existing installation thereby increasing recovery efficiency at a very low capital cost. In particular, an apparatus of the present invention is suitable for retrofitting or adding capacity in existing plants that are operating overcapacity, or for reducing the footprint of new installations given the reduced size of an apparatus of the present invention in comparison with the devices of conventional flotation technology.

In the description that follows, like parts are marked throughout the specification and the drawings with the same respective reference numerals.

Figure 1:
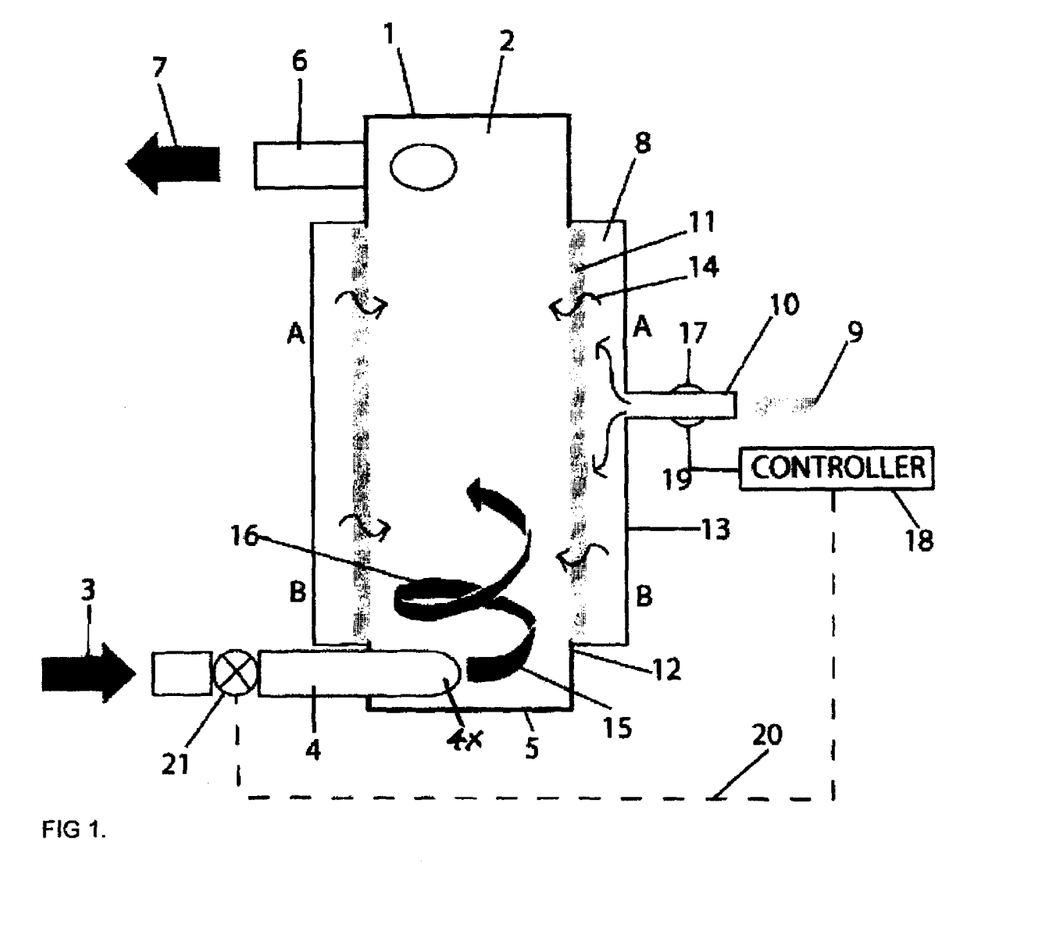
FIG. 1 is a perspective view of the apparatus.

With particular reference to FIG. 1, a preferred embodiment and its operation are described with respect to slurry. Apparatus 1 comprises a cylindrical chamber 2, which when in use typically is inclined, although the cylindrical chamber can be oriented in any direction. The slurry is introduced into apparatus 1 in the direction of arrow 3 through conduit 4 via entry port 4x that is positioned tangentially relative to chamber 2 forming flowing slurry 15. The lower end 5 of the chamber 2 is closed so that slurry stream 15 flows in the direction of arrow 7 toward exit port 6 located at the output end, which exit port 6 in turn can be oriented or of such size and shape as to discharge slurry stream 15 along various angles outside chamber 2 such as directly or tangentially as shown.

As slurry stream 15 progresses along the inner surface of chamber 2, gas is introduced orthogonally into the slurry through porous wall 11.

It is appreciated that a variety of gas introduction mechanisms may be provided to communicate with the inner surface of the cylindrical chamber. For purposes of description and illustration of the particular embodiment of FIG. 1, plenum 8, located circumferentially of the cylindrical inner chamber 2, envelops a porous wall 11. Of course, such plenum could be formed in segments or rings or both. Plenum 8 is defined by an outer shell 13, which encloses the hollow cylinder of porous wall 11. Porous wall 11 is flush with inner surface 12 to define a continuing inner surface. Gas is introduced through inlet tube 10 in the direction of arrow 9 and pressurizes the chamber within the plenum 8 whereby gas permeates through the porous wall 11 to introduce bubbles into the slurry stream 15. Sufficient pressure is developed in plenum 8 to cause the gas within to diffuse through the porous wall 11 in the direction of arrows 14 circumferentially of chamber 2 to thereby and orthogonally introduce gas into flowing slurry stream 15.

As slurry stream 15 flows along inner wall 12 of chamber 2, more and more gas bubbles are developed in slurry stream 15 and the gas displaces slurry. The ratio of the respective flow rates of slurry and gas into chamber 2, are kept in balance by constant pressure within chamber 2. Typically, the exit velocity of the mixture of slurry and bubbles and particles is higher than the velocity of the slurry entering the vessel.

In an alternative embodiment, a slurry stream can be introduced through an entry port in sufficient volume and at sufficient velocity to develop a vortex, generally designated 16.

In an alternative embodiment, slurry stream 15 can be introduced with optimum flow velocity to generate centrifugal forces of vortex 16 within the range of 20 to 100 Gs so as to enhance the diffusion rate within chamber 2 of apparatus 1.

As is appreciated by those skilled in the art, the pressure of gas 9 in the plenum 8 may be sensed by sensor 17. Sensor 17 can provide output, which is connected to controller 18 via input line 19. Controller 18 has output via line 20 to servo control valve 21. By standard feedback techniques the controller 18 opens and closes the valve 21 in case of pressure drop so to stop the flow of slurry into chamber 2 in order to prevent the slurry from permeating through porous wall 11 into plenum 8.

Figure 2:
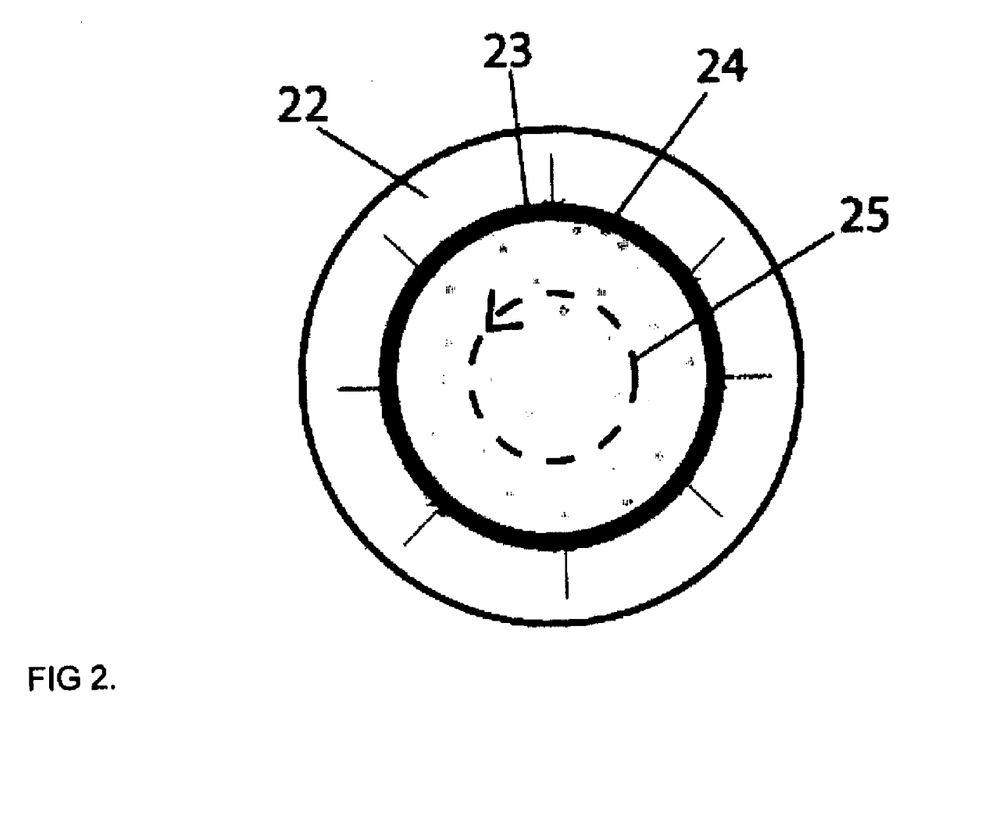
FIG. 2 is a section along the lines AA of the chamber for introducing gas bubbles into the swirling slurry in apparatus of FIG. 1.

With reference to FIG. 2, the development and incorporation or inclusion of gas bubbles in the slurry stream according to the aforesaid embodiments is described. In operation, pressurized gas in plenum 22 permeates through fine mesh 23 to develop minute bubbles 24 at the inner surface of fine mesh 23. As the previously introduced slurry stream flows along inner wall of fine mesh 23, it develops a thickness 25 circumferentially around the inner wall of the chamber. The vortex of the slurry stream extends centrally in the cylindrical chamber along the longitudinal axis of the chamber. Gas introduced through fine mesh 23, encounters the slurry stream orthogonally, and is sheared into numerous bubbles by the high velocity swirl of the slurry imparted by the vortex.

The bubble generation mechanism accomplished with fine mesh 23 is a two-stage process. First, gas migrates through the micro channels of the fine mesh, or porous wall. When leaving the pore, gas creates a small cavity. The cavity grows until the gas encounters the slurry stream orthogonally and the shearing force of the flowing slurry is greater than the cavity's surface tension holding it at the pore. In the second stage, once a bubble is sheared off from the surface of the fine mesh, or porous wall, it begins to flow, and then flows, with the slurry as the slurry is carried by turbulent flow.

The bubbles flowing with the slurry collide with the particles, and at least some hydrophobic particles become attached to the bubbles, while others are entrained within the slurry. The bubble-particle agglomerate, or combination of froth and slurry stream, is transported towards the output end until they are discharged, with reference to FIGS. 1 and 4, at the exit port 6 of chamber 2 in the direction of arrow 7. The discharge from the vessel is directed to flotation tank like a flotation cell or column where a non-turbulent surface region for stable froth formation and removal is provided in the standard way. As persons skilled in the art can appreciate the orientation of the inventive vessel and the connection placement within a flotation machine can be realized in several manners depending on particular installation.

For example, the discharge in flotation devices is often directed into a catch basin surrounding the exit end, the discharged stream then swirling outwardly as it flows into the catch basin having a liquid level proximate the exit end to permit the froth of gas bubbles with attached particles to float toward a peripheral edge of the catch basin whereupon separation of the froth of gas bubbles with attached hydrophobic particles from heavier particles occurs by collecting outwardly floating froth of gas bubbles with attached hydrophobic particles with an upper zone of the catch basin, while heavier particles sink downwardly of the catch basin, and then removing heavier particles from a lower zone of the catch basin to effect the separation, such as through an underflow line or via a gravity drain and with or without vacuum assist. The collection of froth of gas bubbles with attached hydrophobic particles can be aided by the use of skimming devices, typically in large installations, that mechanically gather said froth outwardly of said catch basin typically onto a beach where said catch basin consists of a pond.

Fine mesh 23, which constitutes the porous portion of the porous wall 11, may be constructed of a variety of materials. The fine mesh may be a screen product having rigidity and which defines a reasonably smooth surface to maintain swirling flow in the slurry. For example, a variety of screen meshes' are available which will provide such porosity. Other suitable porous materials include sintered porous materials of metal oxides that have the necessary structural strength yet provide a relatively smooth surface. It is appreciated that other forms of porous materials are available such as sintered, porous, stainless steel of controlled porosity, for example, grade/type 316LSS.

In an alternate embodiment, the mean pore size of the fine mesh or porous wall is no greater than 100 microns.

Figure 3:
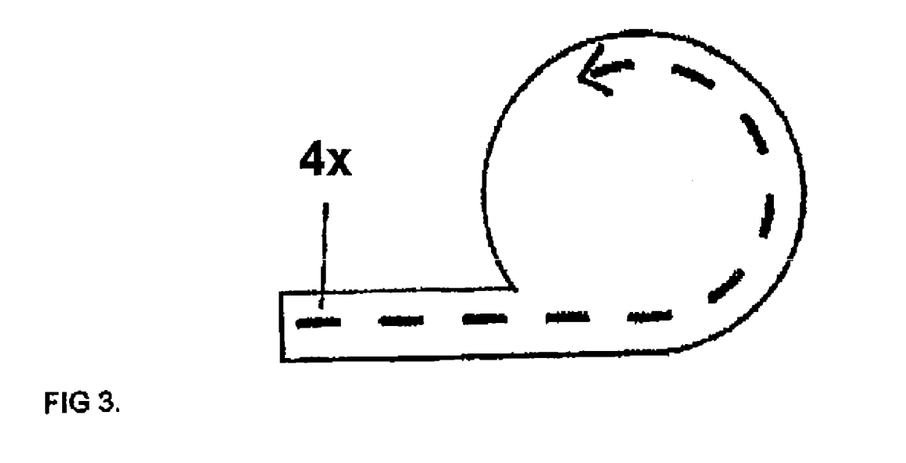
FIG. 3 is a perspective view of the tangential slurry injection header located at the entry portion of the apparatus from of FIG. 1.

As shown in the FIG. 3, the entry port 26 and exit port 27 are located tangentially in respect of the vessel. The exit port is a mirror image of the entry port. The cross section area of the exit port is designed to accommodate volumetric changes of the combined slurry and gas.

Figure 4:
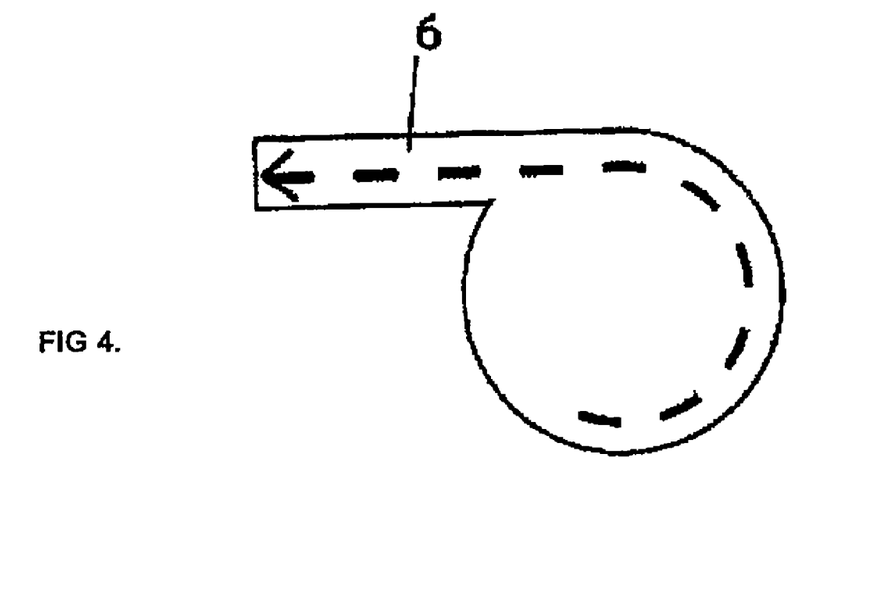
FIG. 4 is a perspective view of the tangential exit header located at the exit portion of the apparatus from of FIG. 1.
Figure 5:
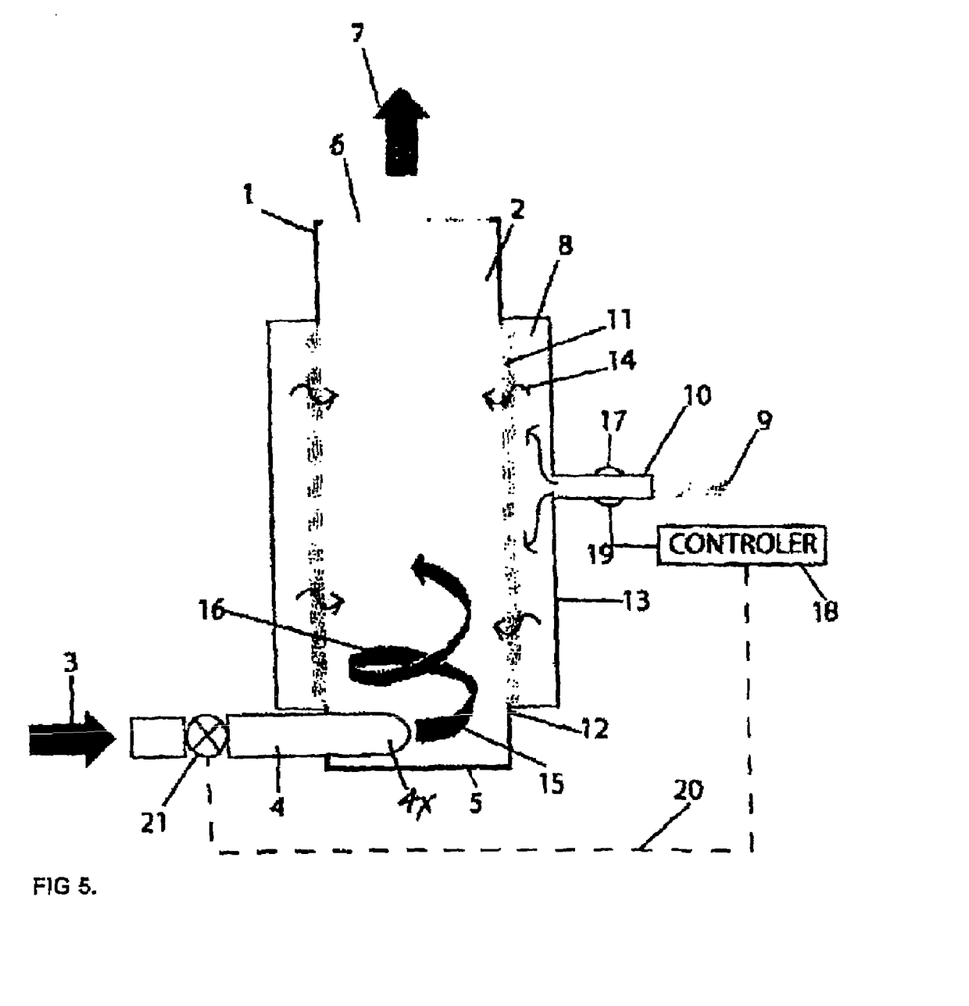
FIG. 5 is a perspective view of the apparatus of FIG. 1 with an alternate exit port 6.

With reference to FIG. 4, in an alternate embodiment, exit port 6 can be of such size and shape as to discharge liquid stream 15 directly outside chamber 2 as effectively as if the output end of the chamber were open.

The foregoing description and the embodiments described therein, are provided by way of illustration of an example, or examples of particular embodiments of principles and aspects of the present invention. These examples are provided for the purposes of explanation, and not of limitation, of those principles and of the invention. It will be understood that various changes, modifications and adaptations may be made without departing from the spirit of the invention.

It will be understood that various changes, modifications and adaptations may be made by those having ordinary skill in the art without departing from the spirit of the invention or the scope thereof as set out by the claims that follow.

The embodiments of the invention in which an exclusive property or privilege is claimed are defined as follows:

1. A process for attaching hydrophobic particles to gas bubbles in a slurry said process comprising:
   a. introducing a stream of said slurry into a vessel having a cylindrical chamber having a cylindrical inner wall, said chamber being of sufficient length to provide a residence time for said stream in said chamber to permit a diffusion of gas into said stream, and said chamber being operable when oriented in any and all directions, said stream being introduced;
      i. tangentially in an entry end near a first end of said chamber in a manner to develop a spiral flow of said stream along said chamber inner wall toward the opposite, second end of said chamber, the exit end; and ii. in sufficient volume and pressure to develop a vortex in said stream extending along said chamber, wherein the velocity of said stream is set to achieve centrifugal forces for said vortex to within a range of 20 to less than 50 G's;

b. introducing gas into said stream during at least a portion of its travel in said chamber, said gas being introduced to said stream orthogonally, through means located at said chamber inner wall for developing gas bubbles which move into said stream, wherein said means comprise material having porosity with mean pore size of less than 20 microns; and c. discharging said stream of slurry with hydrophobic particles attached to gas bubbles from said vessel via said exit end.

2. A process according to claim 1, wherein the step of discharging said stream of slurry with hydrophobic particles attached to gas bubbles from said vessel via said exit end is via one or more tangential exits near said exit end.

3. A process according to claim 1, wherein the step of discharging said stream of slurry with hydrophobic particles attached to gas bubbles from said vessel via said exit end is via an axial end at said exit end.

4. A process according to claim 1, wherein the step of discharging said stream of slurry with hydrophobic particles attached to gas bubbles from said vessel via said exit end is via one or more exits enclosed by a pipe or other conduit.

5. A process according to claim 2, wherein the step of discharging said stream of slurry with hydrophobic particles attached to gas bubbles from said vessel via said exit end is via one or more exits enclosed by a pipe or other conduit.

6. A process according to claim 3, wherein the step of discharging said stream of slurry with hydrophobic particles attached to gas bubbles from said vessel via said exit end is via one or more exits enclosed by a pipe or other conduit.

7. A process for entrainment of hydrophobic particles with gas bubbles in a mixture of water and insoluble liquid or liquids, comprising:

a. introducing a stream of said mixture into a vessel having a cylindrical chamber having a cylindrical inner wall, said chamber being of sufficient length to provide a residence time for said stream in said chamber to permit a entrainment of particles with gas bubbles in said stream, and said chamber being operable when oriented in any and all directions, said stream being introduced;
i. tangentially in an entry end near a first end of said chamber in a manner to develop a spiral flow of said stream along said chamber inner wall toward the opposite, second end of said chamber, the exit end; and
ii. in sufficient volume and pressure to develop a vortex in said stream extending along said chamber, wherein the velocity of said stream is set to achieve centrifugal forces for said vortex to within a range of 20 to less than 50 G's;

b. introducing gas into said stream during at least a portion of its travel in said chamber, said gas being introduced to said stream orthogonally, through means located at said chamber inner wall for developing gas bubbles which move into said stream, wherein said means comprise material having porosity with mean pore size of less than 20 microns; and c. discharging said stream with hydrophobic particles entrained with gas bubbles from said vessel via said exit end.

8. A process according to claim 7, wherein the step of discharging said stream with hydrophobic particles entrained with gas bubbles from said vessel via said exit end is via one or more tangential exits near said exit end.

9. A process according to claim 7, wherein the step of discharging said stream with hydrophobic particles entrained with gas bubbles from said vessel via said exit end is via an axial end at said exit end.

10. A process according to claim 7, wherein the step of discharging said stream with hydrophobic particles entrained with gas bubbles from said vessel via said exit end is via one or more exits enclosed by a pipe or other conduit.

11. A process according to claim 8, wherein the step of discharging said stream with hydrophobic particles entrained with gas bubbles from said vessel via said exit end is via one or more exits enclosed by a pipe or other conduit.

12. A process according to claim 9, wherein the step of discharging said stream with hydrophobic particles entrained with gas bubbles from said vessel via said exit end is via one or more exits enclosed by a pipe or other conduit.

13. An apparatus for hydrophobic particles and gas bubble attachment in a slurry comprising:

a. a vessel comprising a chamber having a cylindrical inner wall, said chamber being of sufficient length to provide a residence time for a stream of slurry in said chamber to permit a diffusion of gas into said stream, and said chamber being operable when oriented in any and all directions, said chamber being oriented in any direction, b. means for introducing said stream tangentially of said inner wall, said stream introducing means being positioned near a first end of said chamber, the entry end, to direct said stream in a manner to develop a spiral flow of said stream along said inner wall toward an opposite, second end of said chamber, the exit end, in sufficient volume and pressure to develop a vortex in said stream extending along said inner wall, and said stream introducing means capable of controlling the velocity of said stream to generate centrifugal forces for said vortex to within a range of 20 to less than 50 Gs within said vessel;

c. at least one gas entry port, for introducing gas into said inner chamber through means located along at least a portion of said chamber inner wall and extending at least in part there around, for introducing gas orthogonally into said inner chamber as said stream passes over said gas introduction means, wherein said gas introduction means comprise material having porosity with mean pore size of less than 20 microns; and d. means to discharge said stream with hydrophobic particles attached to gas bubbles from said vessel via said exit end.

14. An apparatus according to claim 13, wherein the means to discharge said stream with hydrophobic particles attached to gas bubbles from said vessel via said exit end includes one or more tangential exits near said exit end.

15. An apparatus according to claim 13, wherein the means to discharge said stream with hydrophobic particles attached to gas bubbles from said vessel via said exit end includes an axial end at said exit end.

16. An apparatus according to claim 13, wherein the means to discharge said stream with hydrophobic particles attached to gas bubbles from said vessel via said exit end includes one or more exits enclosed by a pipe or other conduit.

17. An apparatus according to claim 14, wherein the means to discharge said stream with hydrophobic particles attached to gas bubbles from said vessel via said exit end includes one or more exits enclosed by a pipe or other conduit.

18. An apparatus according to claim 15, wherein the means to discharge said stream with hydrophobic particles attached to gas bubbles from said vessel via said exit end includes one or more exits enclosed by a pipe or other conduit.

19. An apparatus for hydrophobic particles entrainment with gas bubble attachments in a mixture of water and insoluble liquid or liquids, comprising:
- a. a vessel consisting of a chamber having a cylindrical inner wall, said chamber being of sufficient length to provide a residence time for a stream of a mixture of water and insoluble liquid or liquids in said chamber to permit a diffusion of gas into said stream, and said chamber being operable when oriented in any and all directions, said chamber being oriented in any direction,
- b. means for introducing said stream tangentially of said inner wall, said stream introducing means being positioned near a first end of said chamber, the entry end, to direct said stream in a manner to develop a spiral flow of said stream along said inner wall toward an opposite, second end of said chamber, the exit end, in sufficient volume and pressure to develop a vortex in said stream extending along said inner wall, and said stream introducing means capable of controlling the velocity of said stream to generate centrifugal forces for said vortex to within a range of 20 to less than 50 Gs within said vessel;
- c. at least one gas entry port, for introducing gas into said inner chamber through means located along at least a portion of said chamber inner wall and extending at least in part there around, for introducing gas orthogonally into said inner chamber as said stream passes over said gas introduction means, wherein said gas introduction means comprise material having porosity with mean pore size of less than 20 microns; and
- d. means to discharge said stream with hydrophobic particles entrained with gas bubbles from said vessel via said exit end.

20. An apparatus according to claim 19, wherein the means to discharge said stream with hydrophobic particles entrained with gas bubbles from said vessel via said exit end includes one or more tangential exits near said exit end.

21. An apparatus according to claim 19, wherein the means to discharge said stream with hydrophobic particles entrained with gas bubbles from said vessel via said exit end includes an axial end at said exit end.

22. An apparatus according to claim 19, wherein the means to discharge said stream with hydrophobic particles entrained with gas bubbles from said vessel via said exit end includes one or more exits enclosed by a pipe or other conduit.

23. An apparatus according to claim 20, wherein the means to discharge said stream with hydrophobic particles entrained with gas bubbles from said vessel via said exit end includes one or more exits enclosed by a pipe or other conduit.

24. An apparatus according to claim 21, wherein the means to discharge said stream with hydrophobic particles entrained with gas bubbles from said vessel via said exit end includes one or more exits enclosed by a pipe or other conduit.

* * * * *